Dec. 18, 1951 R. A. LANDER, JR 2,579,265
AIRPLANE RUDDER AND AILERON CONTROL
Filed Aug. 1, 1947 4 Sheets-Sheet 1
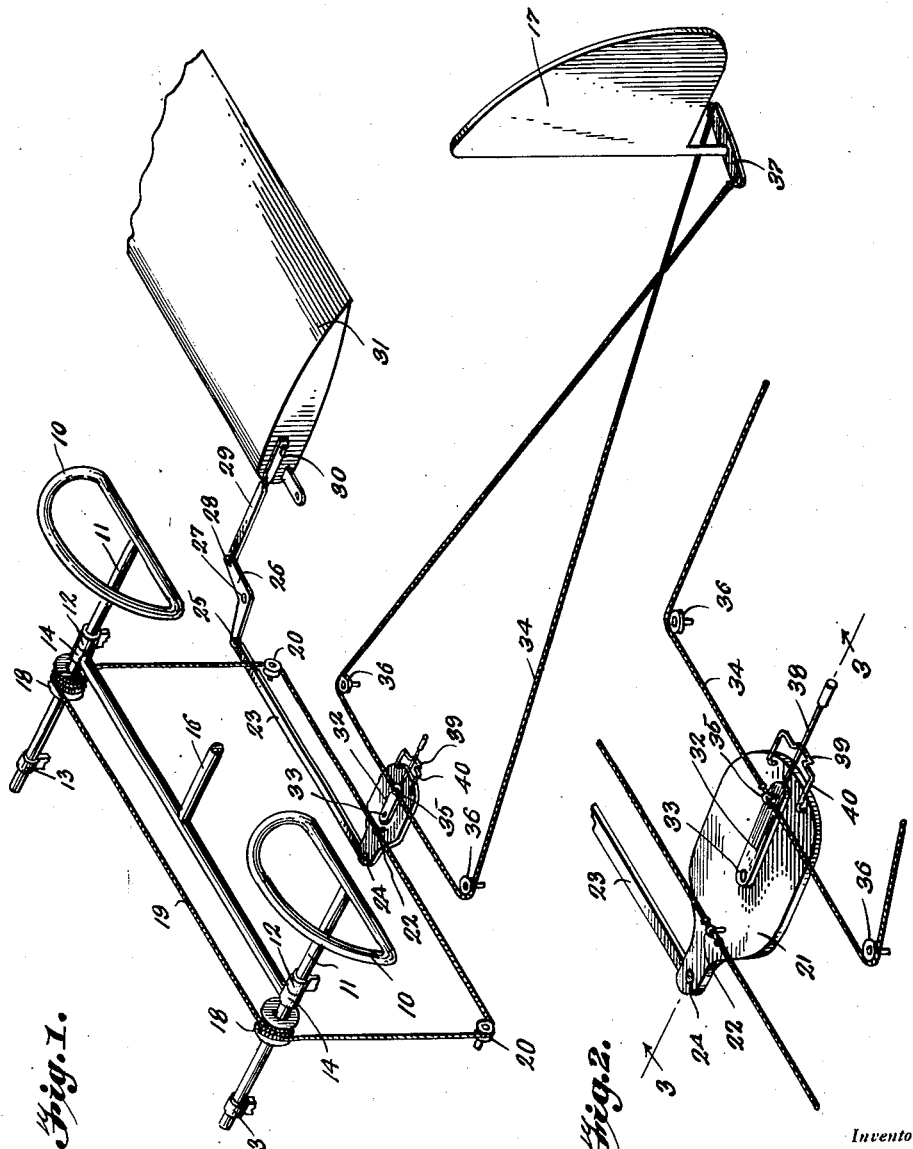
Inventor
RAYMOND A. LANDER, JR.
By Randolph & Beavers
Attorneys Dec. 18, 1951     R. A. LANDER, JR     2,579,265
AIRPLANE RUDDER AND AILERON CONTROL
Filed Aug. 1, 1947     4 Sheets-Sheet 2
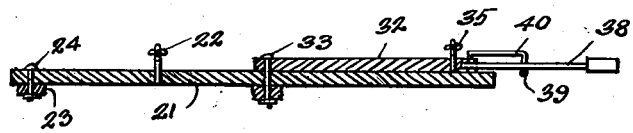
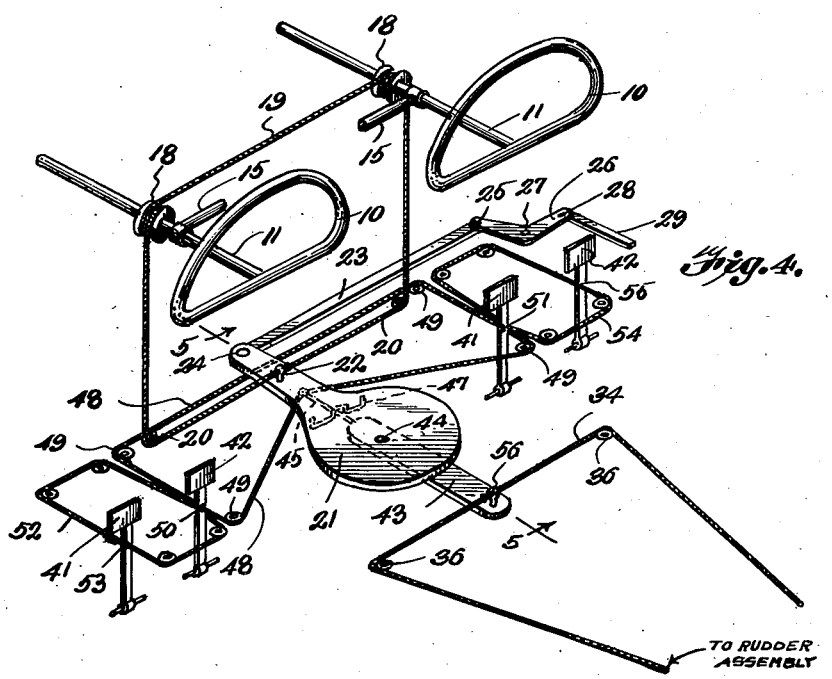
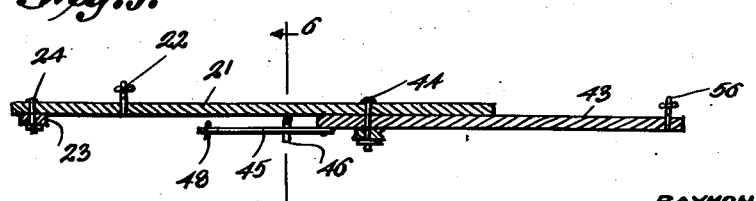
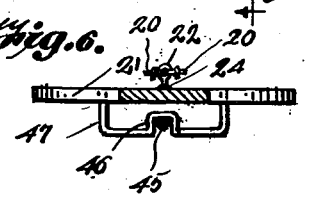
Inventor
RAYMOND A. LANDER, JR.
By Randolph & Beavers
Attorneys Dec. 18, 1951  R. A. LANDER, JR  2,579,265
AIRPLANE RUDDER AND AILERON CONTROL
Filed Aug. 1, 1947  4 Sheets-Sheet 3
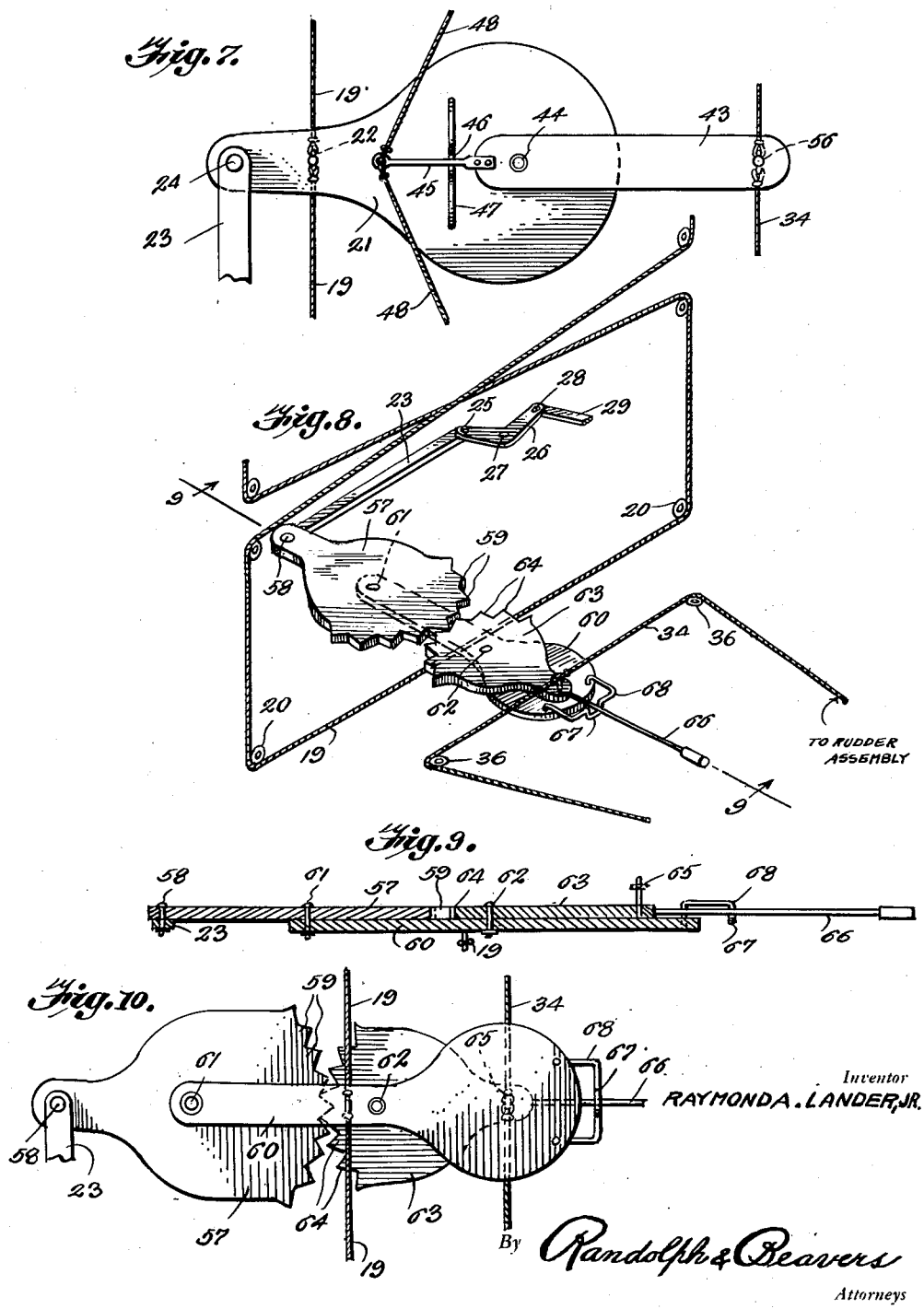
Inventor
RAYMOND A. LANDER, JR.
By Randolph & Beavers
Attorneys Dec. 18, 1951   R. A. LANDER, JR   2,579,265
AIRPLANE RUDDER AND AILERON CONTROL
Filed Aug. 1, 1947   4 Sheets-Sheet 4
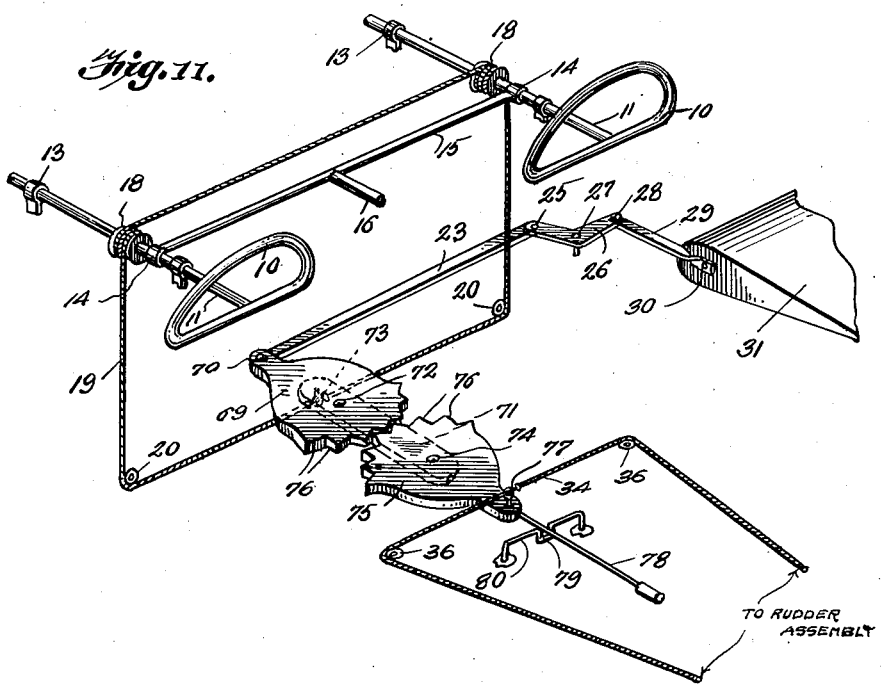
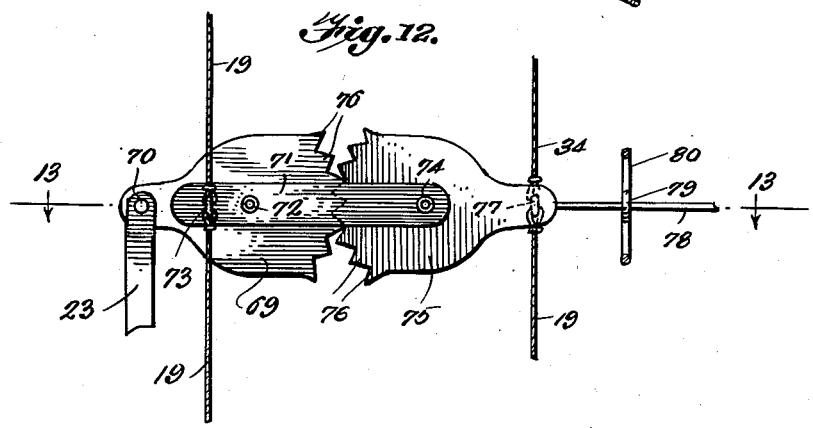
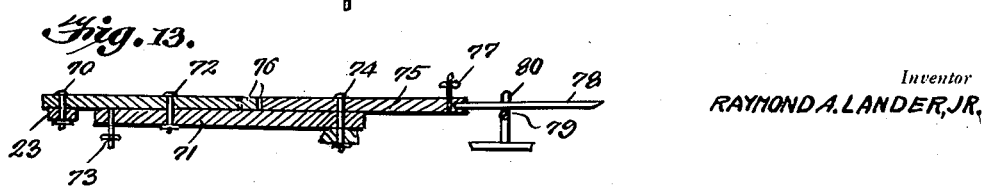
Inventor
RAYMOND A. LANDER, JR.
By Randolph & Beavers
Attorneys Patented Dec. 18, 1951

2,579,265

UNITED STATES PATENT OFFICE 2,579,265

AIRPLANE RUDDER AND AILERON CONTROL

Raymond A. Lander, Jr., Rochester, N. Y.

Application August 1, 1947, Serial No. 765,326

1 Claim. (Cl. 244—83)

The present invention relates to airplane controls and it consists in the combinations, constructions and arrangements of parts herein described and claimed.

The conventional airplane is controlled in flight by three sets of control surfaces: the rudder, which controls the movement of the plane about its vertical axis, the elevators, which control the movement of the plane about its transverse axis and the ailerons, which control the movement of the plane about its longitudinal axis. These control surfaces are connected to three controls, in the conventional plane, which may be operated one at a time or any two or three simultaneously but with one, two or three distinct movements on the part of the pilot.

The three controls in the conventional plane consist of rudder pedals operated by the feet to control the rudder and either a manually operated stick, the fore and aft motion of which controls the elevator and the lateral movement of which controls the ailerons, or a manually operated wheel by which a fore and aft motion controls the elevator and turning motion of which controls the ailerons. While the details of construction of the stick or wheel mechanism may take various forms, the same basic function is always performed, that is the control of the ailerons and rudder.

In actual flight, in order to execute a properly coordinated turn, it is necessary for the pilot to coordinate his movements with the stick or wheel and the rudder controls. Since this coordination is difficult to learn, certain new simplified types of planes, known as two control planes, no longer require the use of rudder pedals for the execution of a turn. This is customarily due to the interconnection of the ailerons and rudder whereby an automatically coordinated turn may be had by the operation of the stick or wheel alone.

Such two control planes have the disadvantage, however, of providing no possibility for the pilot to reverse his controls, that is to say, to apply ailerons to cause a bank in one direction while applying opposite rudder in order to cause a slip. This is particularly disadvantageous when landing where a pilot finds that his elevation is too great as he approaches the landing strip. In such cases, being unable to slip, he must use his elevators thus pointing the nose downwardly to lose altitude which unfortunately causes an increase in speed—a feature to be undesired at that time. Again, if the pilot finds that he must land against a cross wind, with the two control plane, it is impossible to side slip and the pilot is thus at a great disadvantage, unless his plane uses a tri-cycle landing gear.

The present invention is designed, in its several embodiments, to overcome these disadvantages and provide a plane which is normally a two control plane but which may quickly and easily be converted into a three control plane for the purpose of slipping or for providing reverse control for any other reason.

It is, accordingly, an object of the invention to provide a novel means and mechanism whereby an airplane having but two normal controls for movement about its three major axes may be speedily converted into a plane having three separate controls for such purpose.

It is a further object of the invention to provide means and mechanism whereby a plane of the character set forth, having been converted from a two control plane to the three control plane, may be automatically reverted to a two control plane when normal flight is resumed.

A further object of the invention is the provision of novel latching mechanisms interconnecting a two control system and a rudder control.

Other and further objects of the invention will become apparent from a reading of the following specification taken in conjunction with the drawings, in which:

Figure 1 is a schematic view, in perspective, illustrating certain elements utilized in the invention, Figure 2 is a fragmentary perspective view of an embodiment of the invention, Figure 3 is an enlarged sectional view taken along line 3—3 of Figure 2, Figure 4 is a perspective view illustrating another embodiment of the invention, Figure 5 is an enlarged sectional view taken along line 5—5 of Figure 4, Figure 6 is a sectional view taken along line 6—6 of Figure 5, Figure 7 is an enlarged fragmentary bottom plan view of the device shown in Figure 4, Figure 8 is a perspective view illustrating another form the invention may assume, Figure 9 is an enlarged sectional view taken along line 9—9 of Figure 8, Figure 10 is a bottom plan view of the device illustrated in Figure 8, Figure 11 is a perspective view of another form the invention may take, Figure 12 is a bottom plan view of the device shown in Figure 11, and Figure 13 is a sectional view taken along line 13—13 of Figure 12.

Referring more particularly to the drawings, wherein similar parts are given similar reference characters, there is shown several embodiments of the invention illustrated in each case in connection with a dual wheel control mechanism. It is to be understood, however, that the embodiments of the invention are equally capable of being utilized with planes having a single set of controls or having a tandem control or, in fact, any known type of control.

In Figures 1 to 3 there is shown a pair of control wheels 10 each mounted on a longitudinally extending shaft 11, which shafts are adapted to pass through bearings 12 carried by the instrument panel and bearings 13 mounted upon the skeleton of the plane. The shafts 11 also pass through bearings 14 and are free to revolve therein but not to move longitudinally therethrough. The bearings 14 are interconnected by means of a rod 15 to which is attached centrally a rearwardly extending rod 16 which is connected by means of linkage, levers or the like (not shown) to the vertical rudder 17 of the airplane.

A drum 18 is keyed to each of the shafts 11, so as to rotate with the shafts, and to allow the shafts to move therethrough, and a cable 19 is adapted to have several turns wound upon each of the drums 18 and thence pass downwardly over a pair of pulleys 20 and inwardly to a plate 21 where its ends are fastened thereto as indicated at 22. The forward end of the plate 21 has pivotally connected thereto a laterally extending link 23 as indicated at 24 and the outer end of the link is pivotally connected at 25 to one arm of a bell crank lever 26 which is pivotally mounted at 27 and has its other arm pivoted at 28 to the front end of a link 29 pivotally connected at its rearward end at 30 to an aileron 31.

The plate 21 and the forward end of an arm 32 are pivotally connected by means of a pin 33. The rearward end of the arm is attached to a cable 34, as indicated at 35 and the cable is trained over a pair of pulleys 36 and has its ends fastened to the outer end of the horn 37 of the rudder 17. The pin is affixed to the framework or skeleton (not shown) of the airplane or to some other relatively motionless part thereof.

The arm 32 has affixed thereto a rearwardly extending slip control lever 38 which is adapted to normally engage in a depressed portion 39 of a latch 40 carried by the plate 21.

In the operation of this embodiment of the invention, since the slip control lever is normally engaged in the latch 40, the plate 21 and arm 32 will normally pivot as a unit about the pin 33. Hence, for normal turns, a clockwise movement of the control wheels 10 will cause the plate 21 and arm 32 to rotate counterclockwise about the pin 33, causing an inward movement of the link 23 and a movement of the cable 34 to the right. This will cause the right aileron 31 to rise and the left aileron to lower and the rudder 17 to turn to the right. Since the ratio of movement of the ailerons and rudder may be controlled by the sizes of the plate 21 and the arm 32, the turn may be automatically coordinated in this manner without the use of rudder pedals.

In order to cause a slip, the slip control lever 38 is disengaged from the latch 40 by shifting it upwardly out of the depression 39 in any desired manner, thus unlocking the interconnection between rudder and ailerons. The lever 38 may now be utilized independently to control the rudder while the control wheels 10 may be utilized in the conventional manner, that is, to control the ailerons and, of course, the elevators. Movement of the ailerons and rudder may now be reversed, if desired, the slip control lever 38 taking the place of the conventional rudder pedals.

For example, by turning the control wheel to the right, the right aileron will be raised and the left aileron lowered. If, at the same time, the lever 38 is moved to the left, the rudder 17 will be moved to the left, thereby causing the airplane to slip with its right wing low.

Referring now to Figures 4 to 7, inclusive, there is shown another embodiment of the invention wherein, instead of the slip control lever 38 of the embodiment of the invention shown in Figures 1 to 3, inclusive, there is provided a pair of left rudder pedals 41 and a pair of right rudder pedals 42 in conjunction with each control wheel 10. The plate 21 in this case is pivotally connected to an arm 43 by means of a pin 44 which is affixed to the skeleton of the plane. The arm 43 carries a forwardly extending rod 45 which normally engaged in a depressed portion 46 of a latch 47 carried on the underside of the plate 21. The forward end of the rod 45 has affixed thereto the ends of a cable 48 which is trained over a series of pulleys 49 and is affixed, as indicated at 50, to the right rudder pedal 42 of the left-hand set and to the left rudder pedal of the right-hand set, as indicated at 51.

A cable 52 is connected at 50 to the right rudder pedal 42 and to the left rudder pedal 41, at 53, of the left-hand set and a cable 54 is connected at 51 to the left rudder pedal 41 and at 55 to the right rudder pedal 42 of the right-hand set of rudder pedals.

The arm 43 is attached at its rear end to the cable 34, as indicated at 56.

For normal turns, the operation of this form of the invention is the same as that of Figures 1 to 3, inclusive, except that the pedals 41 and 42 will move when one of the control wheels 10 is turned. No foot operation of the pedals is necessary, however, in ordinary flight as the arm 43 and plate 21 move as a unit to automatically coordinate the rudder movement.

When it is desired to slip, however, the rod 45 is automatically disengaged from the latch 47 by use of the rudder pedals and the rudder 17 may then be controlled in the conventional manner.

Referring now to the form of the invention disclosed in Figures 8 to 10, inclusive, it will be seen that there is provided a plate 57 pivotally connected at its forward end, as indicated at 58, to the link 23 and having gear teeth 59 at its rearward end and pivotally connected to the forward end of an arm 60 by means of a pin 61 which is affixed to the skeleton of the airplane.

To the arm 60 is pivotally affixed by means of a pin 62 a plate 63 having gear teeth 64 at its forward end and which are adapted to engage teeth 59 of plate 57. The rudder cable 34 is affixed to the rearward end of the arm 63, as indicated at 65. The rearward end of the plate 63 carries a slip control lever 66 which is adapted to normally lie in a depressed portion 67 of a latch 68 carried at the rearward end of the arm 60. Cable 19 is attached to the center portion of arm 60.

In the operation of this form of the invention, in a normal turn, if, for example, the control wheel is turned to the right, the plates 57 and 63 will rotate counterclockwise about the pin 61, causing the right aileron to rise and the left aileron to lower and the rudder to move to the right, thereby producing a coordinated right turn of the airplane.

In order to slip the airplane, the slip control lever 66 is manually disengaged from the latch 68, thus unlocking the interconnection between the ailerons and the rudder and allowing a reversal of the respective movements of the ailerons and rudder by manual operation of the slip control lever while holding the control wheel in a neutral position.

To effect a slip with the right wing low, for example, the control wheel will be held in a neutral position. This will hold the arm 60, by means of the cable 19, in a neutral position also. Movement of the slip control lever 66 to the left will cause the plate 63 to rotate clockwise about the pin 62 with respect to the arm 60 which, through the gear teeth 59 and 64, will cause a counterclockwise movement of the plate 57 about the pin 61 with respect to the arm 60, thus causing the rod 23 to move to the left and thereby causing the right aileron to rise and the left aileron to drop and the rudder to turn to the left. The movement of the lever 66 to the right will cause a slip with the left wing low.

In the form of the invention shown in Figures 11 to 13, inclusive, there is provided a plate 69 which is pivotally connected at 70 to the link 23 at its forward end and which is provided with gear teeth 76 at its rearward end.

An arm 71 is pivoted to the plate 69 by means of a pin 72 and has its forward end attached to the ends of the cable 19, as shown at 73, and its rearward end pivotally mounted on a pin 74 affixed to the skeleton of the airplane. Also pivotally mounted on the pin 74 is a plate 75 having gear teeth 76 at its forward end.

The rearward end of the plate 75 is attached to the rudder cable 34, as shown at 77, and carries a rearwardly extending slip control lever 78 which is adapted to lie normally in a depressed portion 79 of a latch 80 which is secured to the skeleton of the airplane or to some other relatively motionless portion of the airplane.

In the operation of this form of the invention, for a normal turn, for example, to the right, a clockwise movement of the control wheel will cause the arm 71 to rotate in a counterclockwise direction about the pin 74, and, since the plate 69 and the plate 75 are geared together, the plate 69 will rotate in a counterclockwise direction about the pin 72, thereby pulling the link 23 inwardly, causing the right aileron to rise and the left aileron to lower, producing a coordinated turn to the right, the rudder cable and, consequently, the rudder 17, meanwhile remaining unmoved, this particular system being designed for use in airplanes not requiring the use of the rudder in making normal turns.

In order to produce a slip, the slip control lever 78 is disengaged from the latch 80 thus unlocking the rudder and allowing a reversal of the respective movements of the ailerons and the rudder by the manual operation of the slip control lever while holding the wheel control in a neutral position.

Movement of the slip control lever to the left will cause the plate 75 to rotate clockwise with respect to the arm 71 which will cause a counterclockwise rotation of the plate 69 with respect to the arm 71. This will cause the link 23 to move inwardly, causing the right aileron to rise and the left aileron to drop and the rudder 17 to turn to the left, causing the airplane to slip with the right wing low. A movement of the lever 78 to the right will cause a slip with the left wing low.

In all forms of the invention, the latches employed will automatically reenage after a slipping operation when the controls are returned to normal or neutral positions, or are otherwise coordinated.

While several forms of the invention have been shown and described herein, it will be readily apparent to those skilled in the art that many minor modifications may be made herein without departing from the spirit of the invention or the scope of the appended claim.

What is claimed is:

A control system for an airplane including a vertical pin affixed to the airplane, a horizontally extending plate pivotally mounted upon said pin, an arm pivoted at its forward end to said pin and extending rearwardly beneath said plate, a rudder for said airplane, a cable interconnecting the rear of said arm with said rudder, a revoluble control column for said airplane, a cable movable by the turning of said column and connected with the forward end of said plate to oscillate the same about said pin, a latch on the underside of the plate, a forwardly extending rod affixed to the forward end of said arm and releasably engageable in said latch, rudder pedals for said airplane, and cables interconnecting the forward end of the rod with said pedals whereby independent movement of the latter will disengage the rod from said latch.

RAYMOND A. LANDER, JR.

REFERENCES CITED

The following references are of record in the file of this patent:

UNITED STATES PATENTS

| Number | Name | Date |
|---|---|---|
| 2,318,833 | Stambach | May 11, 1943 |

FOREIGN PATENTS

| Number | Country | Date |
|---|---|---|
| 323,881 | Germany | Aug. 11, 1920 |